US012800896B2

(12) United States Patent
Wang et al.

(10) Patent No.: US 12,800,896 B2
(45) Date of Patent: Nov. 17, 2026

(54) OPTICAL INTERFERENCE MICROSCOPE SYSTEM

(71) Applicant: Industrial Technology Research Institute, Hsinchu (TW)

(72) Inventors: Ying-Hao Wang, Hsinchu County (TW); Chang Huang, New Taipei (TW); Jui-Hung Tsai, Miaoli County (TW); Hsing-Wei Huang, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 164 days.

(21) Appl. No.: 19/000,722

(22) Filed: Dec. 24, 2024

(65) Prior Publication Data

US 2026/0147199 A1 May 28, 2026

Related U.S. Application Data

(60) Provisional application No. 63/684,433, filed on Aug. 18, 2024.

(30) Foreign Application Priority Data

Nov. 26, 2024 (TW) ................................ 113145486

(51) Int. Cl.
*G02B 21/00* (2006.01)

(52) U.S. Cl.
CPC ..... *G02B 21/0056* (2013.01); *G02B 21/0032* (2013.01); *G02B 21/008* (2013.01)

(58) Field of Classification Search
CPC ............ G02B 21/0056; G02B 21/0052; G02B 21/006; G02B 21/0032; G02B 21/008; G02B 21/0016; G02B 21/02; G01B 9/04
See application file for complete search history.

(56) References Cited

U.S. PATENT DOCUMENTS

| | | | | |
|---|---|---|---|---|
| 2006/0012872 | A1 * | 1/2006 | Hayashi ............. | G02B 21/0076 359/371 |
| 2023/0143387 | A1 | 5/2023 | Matsumoto et al. | |
| 2023/0251470 | A1 | 8/2023 | Jiang et al. | |

FOREIGN PATENT DOCUMENTS

| | | |
|---|---|---|
| CN | 202485797 | 10/2012 |
| CN | 204005438 | 12/2014 |

(Continued)

OTHER PUBLICATIONS

Liu et al. CN-115291377-A English language translation (Year: 2022).*

(Continued)

*Primary Examiner* — Marin Pichler
(74) *Attorney, Agent, or Firm* — JCIPRNET

(57) ABSTRACT

An optical interference microscope system for imaging an element to be measured is provided. The optical interference microscope system includes a light source module, a beam splitter, an objective lens array module, an eyepiece array module, an imaging element, and an optical channel array module. The light source module is adapted to emit an illumination beam. The objective lens array module includes a plurality of objective lens sets. The eyepiece array module includes a plurality of eyepiece sets. The optical channel array module is connected between the eyepiece array module and the imaging element. The optical channel array module includes a plurality of optical channel structures. Each optical channel structure includes a continuous wall surface and an optical channel formed by the continuous wall surface. A central axis of each optical channel structure is coaxial with an optical axis of each eyepiece set, respectively.

17 Claims, 7 Drawing Sheets

100A

(56) References Cited

FOREIGN PATENT DOCUMENTS

| | | | | | |
|---|---|---|---|---|---|
| CN | 107734216 | | | 2/2018 | |
| CN | 111433652 | | | 7/2020 | |
| CN | 115291377 | A | * | 11/2022 | ........... G02B 21/008 |
| CN | 115407501 | | | 11/2022 | |
| CN | 118671952 | | | 9/2024 | |
| JP | 2005069715 | A | * | 3/2005 | |
| TW | 200952103 | | | 12/2009 | |
| TW | 201403122 | | | 1/2014 | |
| TW | 201525432 | | | 7/2015 | |
| TW | 201627181 | | | 8/2016 | |
| TW | 202013039 | | | 4/2020 | |
| TW | 202318056 | | | 5/2023 | |

OTHER PUBLICATIONS

Sekine et al. JP 2005069715 A, English language translation (Year: 2005).*

"Office Action of Taiwan Counterpart Application", issued on Sep. 30, 2025, p. 1-p. 3.

Kuo-Cheng Wu, "Applications of Stops in Optical Systems", Optical engineering, with English translation thereof, Oct. 1981, pp. 15-17.

Cheng-Fang Ho et al., "Stray Light Analysis and Suppression in Optical System", Instruments Today, with English abstract thereof, Feb. 2006, pp. 81-88.

Wei-Cheng Lin et al., "Development of Soft Zoom Lens", Instruments Today, with English abstract thereof, Feb. 2007, pp. 82-92.

* cited by examiner

OPTICAL INTERFERENCE MICROSCOPE SYSTEM

CROSS-REFERENCE TO RELATED APPLICATION

The present application is based on, and claims priority benefit from, U.S. provisional application Ser. No. 63/684,433, filed on Aug. 18, 2024 and Taiwan application serial number 113145486, filed on Nov. 26, 2024, the disclosure of which is hereby incorporated by reference herein in its entirety and made a part of this specification.

TECHNICAL FIELD

The disclosure relates to a microscope device, and particularly relates to an optical interference microscope system.

BACKGROUND

In response to future market demands, the widespread application of advanced packaging chips has led to high-performance computing elements becoming increasingly mainstream. When an inspection area for a single chip is large, using multiple devices for simultaneous inspection to accelerate the process is impractical. Therefore, achieving fast and precise three-dimensional (3D) profile detection has become a primary development goal in the field.

Currently, white light interference can achieve nanometer-level precision in detection; however, the speed of conventional white light interference detection is often limited. Multi-lens detection solutions require additional components for scanning, which can lead to high equipment setup costs. In addition, the multi-lens architecture must maintain consistent coplanarity among all elements to comply with the white light coherence length specification of 10 micrometers or less, thereby enabling simultaneous scanning. Unfortunately, existing optical clamping mechanisms often lacks sufficient machining precision, resulting in lens coplanarity exceeding 10 micrometers. This discrepancy hinders simultaneous scanning and complicates field-of-view expansion through array configurations. In other words, current developments face a bottleneck in detection speed, rendering them unsuitable for online inspection. Besides, multi-lens detection systems suffer from measurement light interference, which adversely affects detection quality.

SUMMARY

One of the exemplary embodiments of the disclosure provides an optical interference microscope system, which may avoid mutual interference between a plurality of measurement beams during transmission, suppress stray light, and reduce interference signal aberrations, thereby maintaining the ability to receive good optical interference signals.

One of the exemplary embodiments of the disclosure provides an optical interference microscope system for imaging an element to be measured. The optical interference microscope system includes a light source module, a beam splitter, an objective lens array module, an eyepiece array module, an imaging element, and an optical channel array module. The light source module is adapted to emit an illumination beam. The beam splitter is arranged on a path of the illumination beam from the light source module and is configured to reflect the illumination beam and allow the measurement beam to pass through. The objective lens array module is arranged on a path of the illumination beam from the beam splitter. The objective lens array module is configured to allow the illumination beam to pass through and travel to the element to be measured and configured to allow the measurement beam from the element to be measured to pass through. The objective lens array module includes a plurality of objective lens sets. The eyepiece array module is arranged on a path of the measurement beam from the beam splitter and includes a plurality of eyepiece sets. The imaging element is arranged on the path of the measurement beam and configured to generate imaging information according to the measurement beam. The optical channel array module is connected between the eyepiece array module and the imaging element. The optical channel array module includes a plurality of optical channel structures. Each of the optical channel structures includes a continuous wall surface and an optical channel formed by the continuous wall surface. A central axis of each optical channel is coaxial with an optical axis of each eyepiece set, respectively.

In the optical interference microscope system provided in one or more exemplary embodiments of the disclosure, the optical interference microscope system includes the light source module, the beam splitter, the objective lens array module, the eyepiece array module, the imaging element, and the optical channel array module. The illumination beam emitted by the light source module travels to the element to be measured through the beam splitter and the objective lens array module to generate the measurement beam. The measurement beam generated by the element to be measured travels to the imaging element for imaging through the objective lens array module, the beam splitter, the eyepiece array module, and the optical channel array module. The optical channel array module is connected between the eyepiece array module and the imaging element. The optical channel array module includes the optical channel structures, each optical channel structure includes the continuous wall surface and the optical channels formed by the continuous wall surface, and the central axis of each optical channel structure is coaxial with the optical axis of each eyepiece set, respectively. As a result, mutual interference between a plurality of measurement beams during transmission may be avoided, stray light may be suppressed, and interference signal aberrations may be reduced, thereby ensuring that the imaging element can receive good optical interference signals.

To make this disclosure more clearly comprehensible, exemplary embodiments are described below in detail with reference to the accompanying drawings.

BRIEF DESCRIPTION OF THE DRAWINGS

The accompanying drawings are included to provide a further understanding of the disclosure, and the accompanying drawings are incorporated in and constitute a part of this specification. The drawings illustrate the exemplary embodiments of the disclosure, and together with the description, serve to explain the principle of the disclosure.

DETAILED DESCRIPTION OF DISCLOSED EMBODIMENTS

Figure 1:
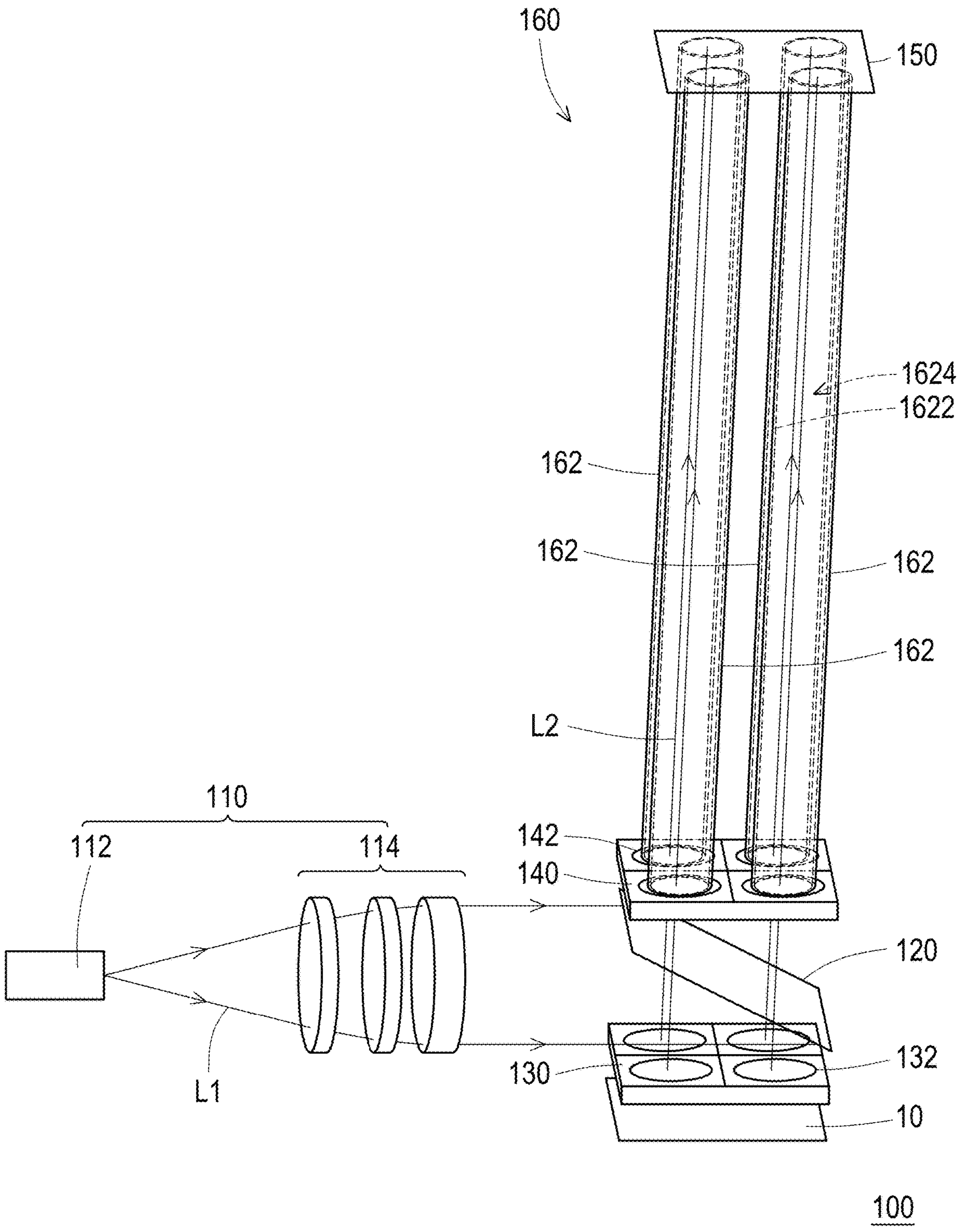
FIG. 1 is a schematic view of an optical interference microscope system according to an exemplary embodiment of the disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic view of an optical interference microscope system according to an exemplary embodiment of the disclosure. With reference to FIG. 1, in this exemplary embodiment, an optical interference microscope system 100 for imaging and measuring an element to be measured 10 (e.g., a chip package) is provided. The optical interference microscope system 100 includes a light source module 110, a beam splitter 120, an objective lens array module 130, an eyepiece array module 140, an imaging element 150, and an optical channel array module 160. The optical interference microscope system 100 is, for instance, a white light interference microscope, which utilizes optical interference principles to display a surface or an internal structure of the element to be measured 10. The white light interference microscope can be applied for rapid and precise 3D measurements.

The light source module 110 is adapted to emit an illumination beam L1. Specifically, in this exemplary embodiment, the light source module 110 includes a light emitting element 112 and a collimation lens set 114. The light emitting element 112 is a white light emitting element adapted to emit a white illumination beam L1, such as an incandescent lamp, a xenon lamp, a high-pressure sodium lamp, a fluorescent lamp, a metal halide lamp, a white light emitting diode, or a white organic light emitting diode, which should not be construed as a limitation in the disclosure. The collimation lens set 114 may include, for instance, a combination of one or more optical lenses with refractive power for collimating the illumination beam L1. In other words, the light source module 110 is a collimation light source.

The beam splitter 120 is arranged on a path of the illumination beam L1 from the light source module 110 and configured to reflect the illumination beam L1 and allow the measurement beam L2 to pass through. The beam splitter 120 is, for instance, a beam splitting mirror. When the illumination beam L1 travels to the beam splitter 120, the beam splitter 120 reflects the illumination beam L1 passing through the objective lens array module 130 to the element to be measured 10, so that the element to be measured 10 generates a measurement beam L2 carrying structural information. Structural information refers to the relevant information produced by optical interference within the measurement beam L2.

The objective lens array module 130 is arranged on a path of the illumination beam L1 from the beam splitter 120 and configured to allow the illumination beam L1 to pass through and travel to the element to be measured 10, and configured to allow the measurement beam L2 from the element to be measured 10 to pass through. In other words, the illumination beam L1 from the light source module 110 travels to the beam splitter 120 and then the illumination beam L1 is reflected by the beam splitter 120 to travel through the objective lens array module 130 to the element to be measured 10, so as to generate the measurement beam L2 carrying the structural information. The measurement beam L2 travels along a reverse direction of the path of the illumination beam L1 and sequentially passes through the objective lens array module 130 and the beam splitter 120. The objective lens array module 130 includes a plurality of objective lens sets 132, and a plurality optical axes (not shown) of the objective lens set 132 are parallel. To facilitate illustration, FIG. 1 simply shows the objective lens array module 130 including four objective lens sets 132, while the quantity and the manner of arrangement of the objective lens sets 132 should not be construed as limitations in the disclosure. The detailed implementation manner of the objective lens array module 130 will be explained in subsequent paragraphs.

The eyepiece array module 140 is arranged on a path of the measurement beam L2 from the beam splitter 120 and configured to allow the measurement beam L2 from the beam splitter 120 to pass through. In other words, the measurement beam L2 carrying the structural information from the element to be measured 10 travels sequentially through the objective lens array module 130, the beam splitter 120, and the eyepiece array module 140. The eyepiece array module 140 includes a plurality of eyepiece sets 142, a plurality of optical axes (not shown) of eyepiece sets 142 are parallel, and the optical axis of each eyepiece set 142 is respectively coaxial with the optical axis of each objective lens set 132. In this exemplary embodiment, the objective lens array module 130 and the eyepiece array module 140 are substantially identical, which should not be construed as a limitation in the disclosure.

The imaging element 150 is arranged on the path of the measurement beam L2 and configured to generate imaging information based on the measurement beam L2. The imaging information refers to the presenting of the structural information via an imaging element. The imaging element 150 is, for instance, a photosensitive element, such as a charge coupled device (CCD) or a complementary metal oxide semiconductor (CMOS) transistor. In this exemplary embodiment, the optical interference microscope system 100 includes one single imaging element 150. In other words, the optical interference microscope system 100 provided in this exemplary embodiment can utilize one single imaging element 150 to simultaneously receive the measurement beams L2 outputting from different eyepiece sets 142 in the eyepiece array module 140 to generate the imaging information.

The optical channel array module 160 is connected between the eyepiece array module 140 and the imaging element 150 and configured to transmit the measurement beam L2 from the eyepiece array module 140 to the imaging element 150. In this exemplary embodiment, an optically effective region of the imaging element 150 is greater than or equal to an optically effective region of the optical channel array module 160, where the optically effective region refers to a range excluding any frame or assembly structure at the edges. In other words, the overall cross-sectional range of the optical channel array module 160 can be designed to be larger than the overall volume of the imaging element 150 according to actual requirements, which should not be construed as a limitation in the disclosure. The eyepiece array module 140 and the imaging element 150 are directly installed at two opposite ends of the optical channel array module 160, respectively. Specifically, a structural length of the optical channel array module 160 is equal to a focal length of the eyepiece array module 140. Therefore, good optical effects may be achieved through simple installation.

The optical channel array module 160 includes a plurality of optical channel structures 162, and each optical channel structure 162 includes a continuous wall surface 1622 and an optical channel 1624 formed by the continuous wall surface 1622. In this exemplary embodiment, the optical channel structures 162 are, for instance, hollow tubular structures. The optical channel structures 162 are spaced apart from one another, and optics within each optical channel structure 162 do not cause interference to others. A central axis (not shown) of each optical channel structure 162 is coaxial with an optical axis of each eyepiece set 142 of the eyepiece array module 140, respectively. In other words, the quantity of the objective lens sets 132 of the objective lens array module 130, the quantity of the eyepiece sets 142 of the eyepiece array module 140, and the quantity of the optical channel structures 162 of the optical channel array module 160 are the same. In this exemplary embodiment, the continuous wall surface 1622 of each of the optical channel structures 162 includes a light-absorbing layer (not shown), e.g., a black light-absorbing material, which is configured to eliminate stray light. In an exemplary embodiment, an aperture size of each optical channel 1624 of the optical channel array module 160 is smaller than or equal to an aperture size of each eyepiece set 142 of the eyepiece array module 140. Moreover, an aperture size of each optical channel 1624 remains consistent from one end near the eyepiece array module 140 to the other end near the imaging element 150. Therefore, the measurement beams L2 outputting from different eyepiece sets 142 in the eyepiece array module 140 travel to the imaging element 150 through different optical channel structures 162, respectively. As such, mutual interference among a plurality of measurement beams L2 during traveling can be avoided, the stray light can be suppressed, and interference signal aberrations can be reduced, thereby ensuring that the imaging element 150 can receive good optical interference signals. In this exemplary embodiment, the optical channel array module 160 does not have any transparent optical element, and thus relevant costs can be saved.

Figure 2:
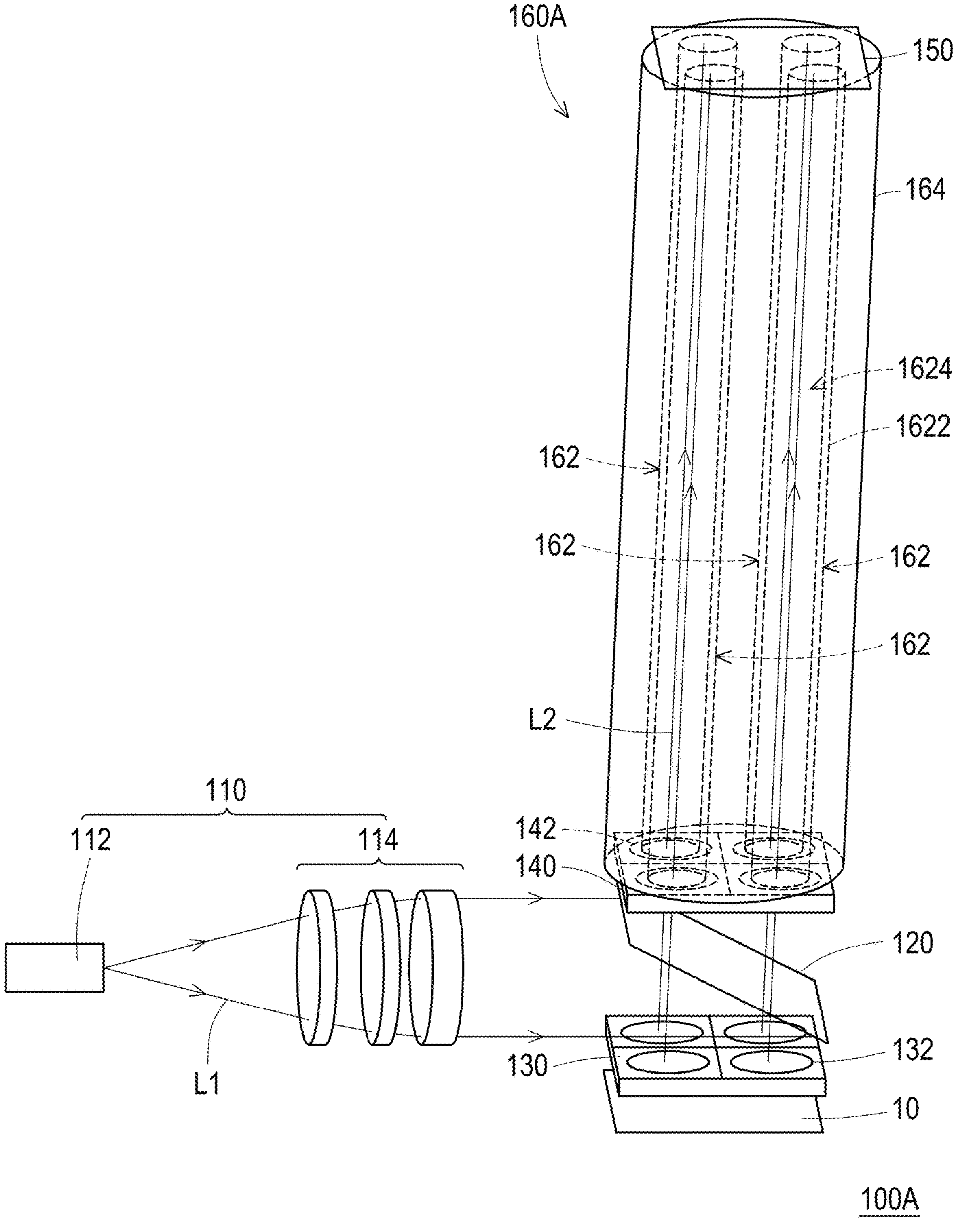
FIG. 2 is a schematic view of an optical interference microscope system according to another embodiment of the disclosure.

FIG. 2 is a schematic view of an optical interference microscope system according to another embodiment of the disclosure. With reference to FIG. 2, an optical interference microscope system 100A shown in this exemplary embodiment is similar to the optical interference microscope system 100 shown in FIG. 1. The difference between the two lies in that an optical channel array module 160A in this exemplary embodiment further includes a main body 164, and the optical channel structures 162 are arranged within the main body 164. Specifically, in this exemplary embodiment, the optical channel structures 162 are a plurality of cavity structures of the main body 164. That is, the optical channels 1624 of the optical channel structures 162 penetrate the main body 164. Similar to the exemplary embodiment depicted in FIG. 1, in this exemplary embodiment, the continuous wall surface 1622 of each optical channel structure 162 includes a light-absorbing layer (not shown), e.g., a black light-absorbing material, which is configured to eliminate stray light. In an exemplary embodiment, an aperture size of each optical channel 1624 of the optical channel array module 160A is smaller than or equal to an aperture size of each eyepiece set 142 of the eyepiece array module 140. Moreover, the aperture size of each optical channel 1624 formed by each continuous wall surface 1622 remains consistent from one end near the eyepiece array module 140 to the other end near the imaging element 150. Therefore, the measurement beams L2 travel from different eyepiece sets 142 in the eyepiece array module 140 to the imaging element 150 through different optical channel structures 162, respectively. As such, mutual interference among the measurement beams L2 during traveling can be avoided, the stray light can be suppressed, and interference signal aberrations can be reduced, thereby ensuring that the imaging element 150 can receive good optical interference signals. In this exemplary embodiment, the optical channel array module 160A does not have any transparent optical element, and thus relevant costs can be saved.

Figure 3:
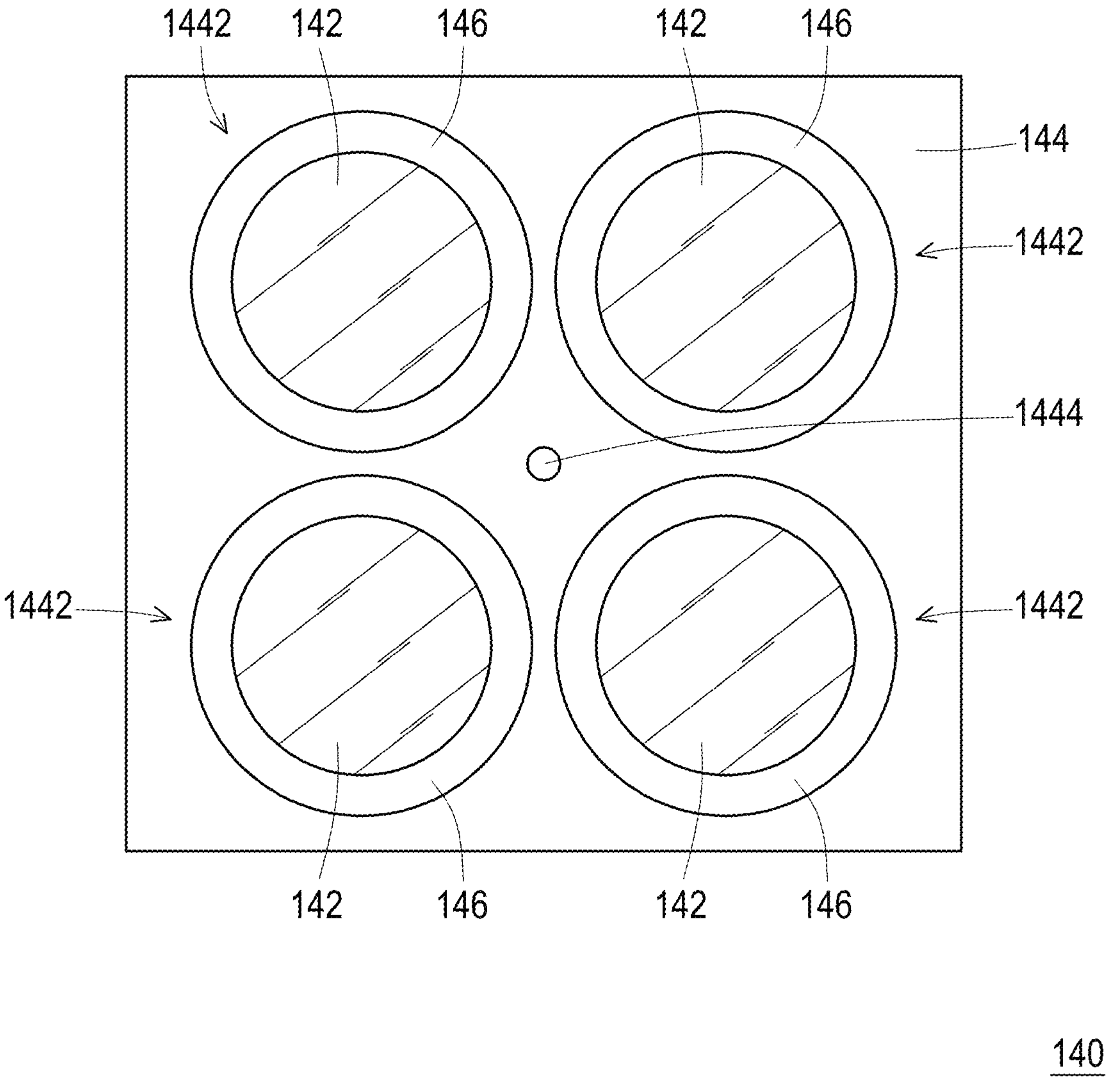
FIG. 3 is a schematic top view of an eyepiece array module according to an exemplary embodiment of the disclosure.

FIG. 3 is a schematic top view of an eyepiece array module according to an exemplary embodiment of the disclosure. With reference to FIG. 3, the eyepiece array module 140 shown in this exemplary embodiment can at least be applied to the optical interference microscope system 100 in FIG. 1 or the optical interference microscope system 100A in FIG. 2, which should however not be construed as a limitation in the disclosure. In this exemplary embodiment, the eyepiece array module 140 further includes a substrate 144 and a plurality of frames 146. The frames 146 are respectively arranged in a plurality of accommodation through holes 1442 of the substrate 144, and the eyepiece sets 142 are respectively arranged within the frames 146. In this exemplary embodiment, the substrate 144 of the eyepiece array module 140 further includes a calibration through hole 1444 located at a symmetrical center of the accommodation through holes 1442 and configured to allow a calibration beam to pass through. The calibration beam is, for instance, a laser beam travelling from the imaging element 150 toward the eyepiece array module 140, and focus calibrations may be performed through reflection imaging of the reflective element in the objective lens array module 130.

Figure 4:
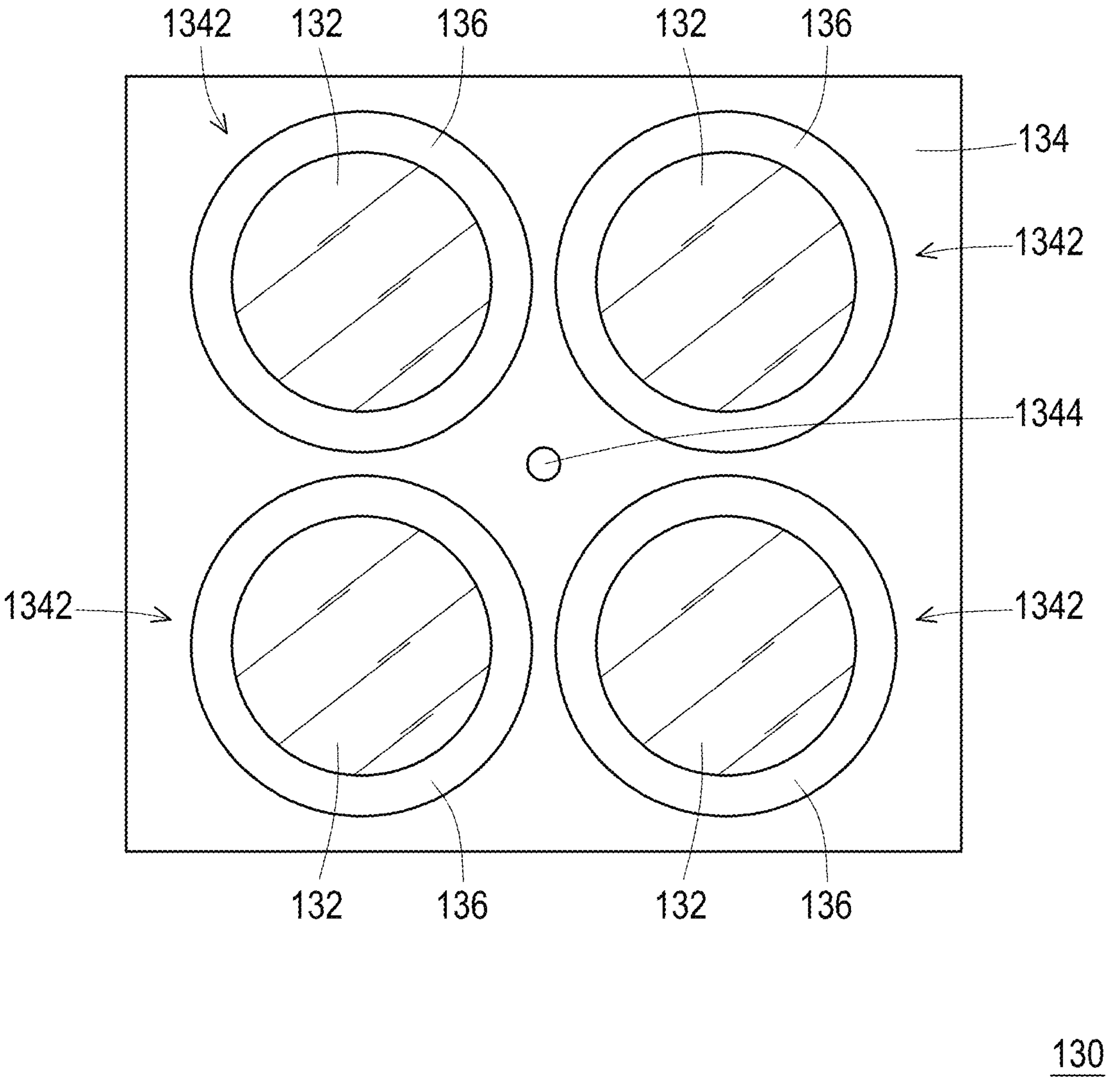
FIG. 4 is a schematic top view of an objective lens array module according to an exemplary embodiment of the disclosure.

FIG. 4 is a schematic top view of an objective lens array module according to an exemplary embodiment of the disclosure. The objective lens array module 130 shown in this exemplary embodiment may at least be applied to the optical interference microscope system 100 in FIG. 1 or the optical interference microscope system 100A in FIG. 2, which should however not be construed as a limitation in the disclosure. In this exemplary embodiment, the objective lens array module 130 further includes a substrate 134 and a plurality of frames 136. The frames 136 are respectively arranged in a plurality of accommodation through holes 1342 of the substrate 134, and the objective lens sets 132 are respectively arranged within the frames 136. The structure of the objective lens array module 130 in this exemplary embodiment is substantially the same as the structure of the eyepiece array module 140, which should however not be construed as a limitation in the disclosure. In this exemplary embodiment, the substrate 134 of the objective lens array module 130 further includes a calibration through hole 1344 located at the symmetrical center of the accommodation through holes 1342 and configured to allow a calibration beam to pass through. The calibration beam is, for instance, a laser beam travelling from the imaging element 150 toward the objective lens array module 130, and focus calibrations can be performed through reflection imaging of the reflective element in the objective lens array module 130.

Figure 5:
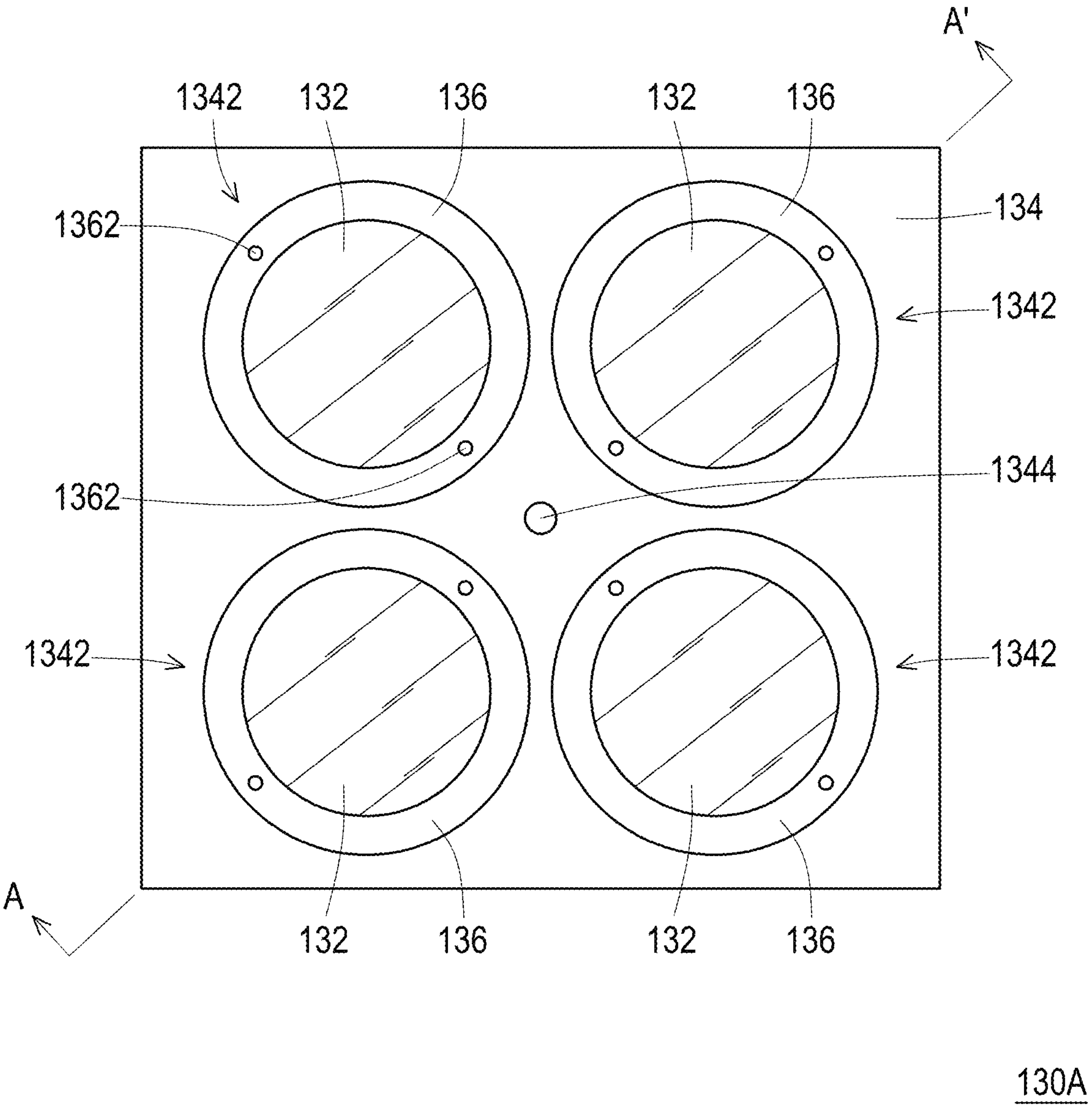
FIG. 5 is a schematic top view of an objective lens array module according to another embodiment of the disclosure.
Figure 6:
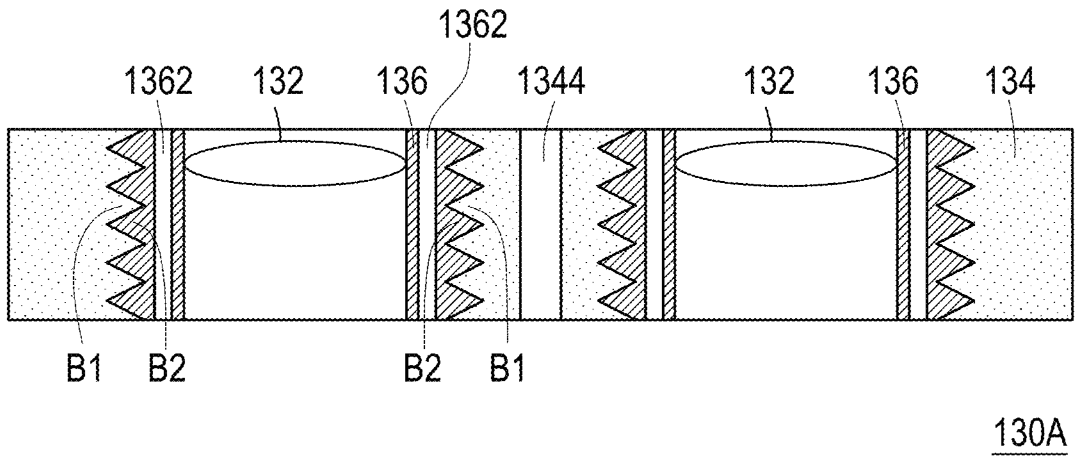
FIG. 6 is a schematic cross-sectional view of the objective lens array module taken along a line A-A' depicted in FIG. 5.

FIG. 5 is a schematic top view of an objective lens array module according to another embodiment of the disclosure. FIG. 6 is a schematic cross-sectional view of the objective lens array module taken along a line A-A' depicted in FIG. 5. With reference to FIG. 5 and FIG. 6, an objective lens array module 130A shown in this exemplary embodiment may at least be applied to the optical interference microscope system 100 in FIG. 1 or the optical interference microscope system 100A in FIG. 2, which should however not be construed as a limitation in the disclosure. The objective lens array module 130A shown in this exemplary embodiment is similar to the objective lens array module 130 shown in FIG. 4. The difference between the two lies in that the objective lens sets 132 of the objective lens array module 130A in this exemplary embodiment are also configured to move relative to the substrate 134 in an extension direction of the optical axis of each objective lens set 132 by the frames 136. Specifically, in this exemplary embodiment, each accommodation through hole 1342 includes an internal threaded structure B1, each frame 136 includes an external thread structure B2, and the external thread structure B2 is adapted to the internal threaded structure B1. In other words, each frame 136 is suitable for being moved respectively in the extension direction of the optical axis of each objective lens set 132 through the threaded structure. In an exemplary embodiment, each frame 136 includes at least one adjustment hole 1362 respectively located around the objective lens sets 132 for respectively adjusting the relative positions of the frames 136 on the substrate 134 with respect to the substrate 134. As such, the objective lens array module 130A provided in this exemplary embodiment may adjust the rotation angle of the frames 136 and thereby adjust the position of each frame 136 on the substrate 134, so as to adjust the focal plane position of the objective lens sets 132 and effectively improve the coplanarity of the objective lens sets 132.

Figure 7:
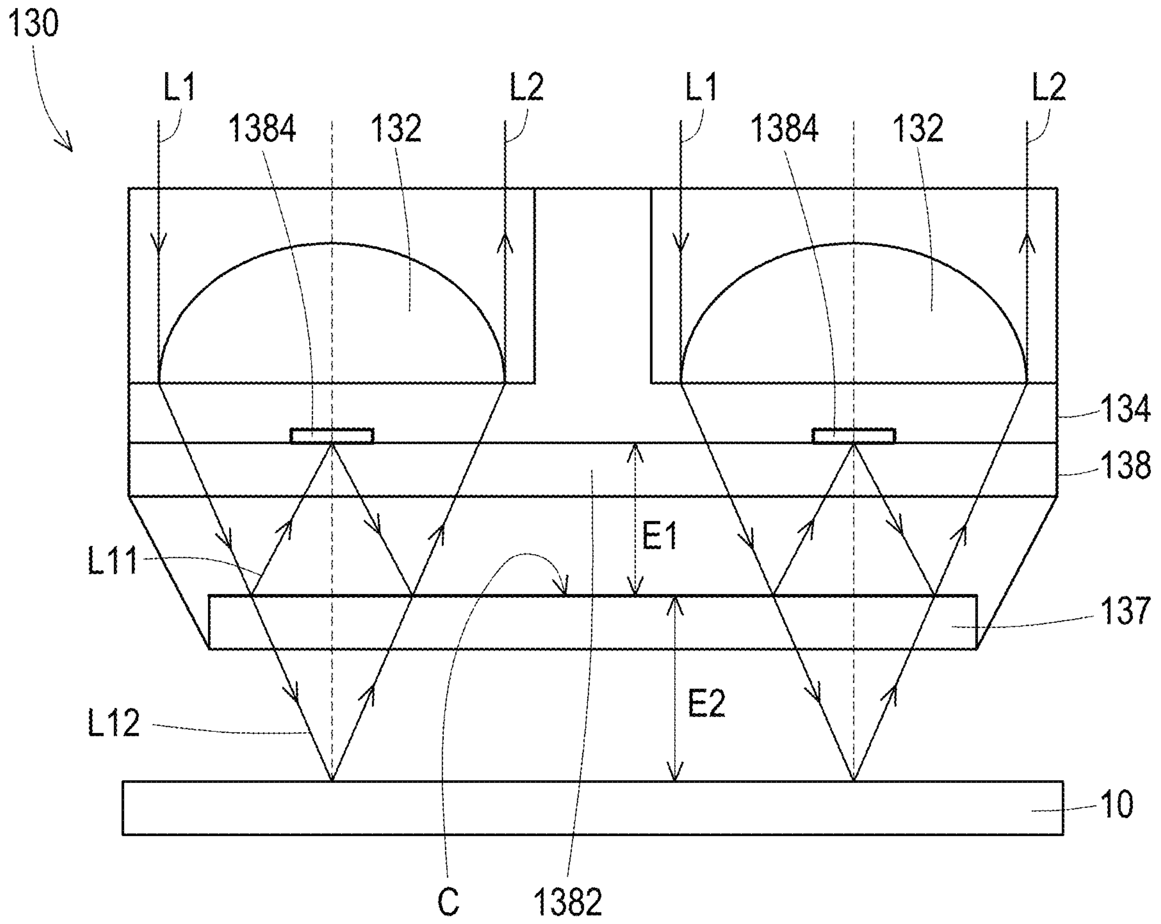
FIG. 7 is a schematic cross-sectional view of a part of the optical interference microscope system in FIG. 1.

FIG. 7 is a schematic cross-sectional view of a part of the optical interference microscope system in FIG. 1. With reference to FIG. 7, specifically, in this exemplary embodiment, the objective lens array module 130 further includes a beam splitter 137 and a reflective element 138. The beam splitter 137 is arranged on the path of the illumination beam L1 from the objective lens sets 132. The illumination beam L1 includes a first light beam L11 and a second light beam L12. The beam splitter 137 is configured to reflect the first light beam L11 and allow the second light beam L12 to pass through and travel to the element to be measured 10. The reflective element 138 is arranged between the beam splitter 137 and the substrate 134 and configured to reflect the first light beam L11 from the beam splitter 137 back to the beam splitter 137. Part of the first light beam L11 and part of the second light beam L2 constitute the measurement beam L2. Specifically, in this exemplary embodiment, the reflective element 138 includes a transparent member 1382 and a plurality of reflective patterns 1384 formed on the transparent member 1382, and positions of these reflective patterns 1384 respectively correspond to positions of the objective lens sets 132. In particular, the reflective patterns 1384 are respectively located on the optical axes of the objective lens sets 132. For instance, the reflective patterns 1384 may be made of a reflective material and respectively formed at specific positions on the transparent member 1382 through a yellow light photolithography process. Therefore, compared to conventional non-array lens modules, no additional reflective mirror is required to be arranged in this exemplary embodiment.

On the other hand, the beam splitter 137 includes a beam splitting surface C, and a distance E1 from the beam splitting surface C to the reflective element 138 is equal to a distance E2 from the beam splitting surface C to the element to be measured 10. The beam splitting surface C may be formed by coating. In other words, the illumination beam L1 forms the first light beam L11 and the second light beam L12 through the beam splitting effect of the beam splitter 137, where the first light beam L11 is reflected by the beam splitting surface C of the beam splitter 137, reaches the reflective patterns 1384 of the reflective element 138, is reflected, and reaches the beam splitting surface C of the beam splitter 137 again. At this time, part of the first light beam L11 is reflected by the beam splitting surface C. The second light beam L12, through the same optical path length, is reflected back to the beam splitting surface C of the beam splitter 137 by the element to be measured 10, and then part of the transmitted second light beam L12 interferes with the part of the first light beam L11 reflected by the beam splitting surface C, thus generating the measurement beam L2.

To sum up, in the optical interference microscope system provided in one or more exemplary embodiments of the disclosure, the optical interference microscope system includes the light source module, the beam splitter, the objective lens array module, the eyepiece array module, the imaging element, and the optical channel array module. The illumination beam emitted by the light source module travels to the element to be measured through the beam splitter and the objective lens array module to form the measurement beam. The measurement beam generated by the element to be measured travels to the imaging element for imaging through the objective lens array module, the beam splitter, the eyepiece array module, and the optical channel array module. The optical channel array module is connected between the eyepiece array module and the imaging element. The optical channel array module includes the optical channel structures, each optical channel structure includes the continuous wall surface and the optical channel formed by the continuous wall surface, and the central axis of each optical channel is coaxial with the optical axis of each eyepiece set. The optical channels formed by continuous wall surfaces are spaced apart from one another, and the measurement beams from different eyepiece sets travel to the imaging element through different optical channels respectively. As such, mutual interference among the measurement beams during traveling can be prevented, stray light can be suppressed, and interference signal aberrations can be reduced, thereby ensuring that the imaging element can receive good optical interference signals.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An optical interference microscope system for imaging an element to be measured, the optical interference microscope system comprising:

a light source module, adapted to emit an illumination beam;

a beam splitter, arranged on a path of the illumination beam from the light source module and configured to reflect the illumination beam and allow a measurement beam to pass through;

an objective lens array module, arranged on a path of the illumination beam from the beam splitter, configured to allow the illumination beam to pass through and travel to the element to be measured, and configured to allow the measurement beam from the element to be measured to pass through, the objective lens array module comprising a plurality of objective lens sets;

an eyepiece array module, arranged on a path of the measurement beam from the beam splitter and comprising a plurality of eyepiece sets;

an imaging element, arranged on the path of the measurement beam and configured to generate imaging information according to the measurement beam; and an optical channel array module, connected between the eyepiece array module and the imaging element and comprising a plurality of optical channel structures, each of the optical channel structures comprising a continuous wall surface and an optical channel formed by the continuous wall surface, a central axis of each of the optical channel structures being coaxial with an optical axis of each of the eyepiece sets, respectively.

2. The optical interference microscope system according to claim 1, wherein a length of the optical channel array module is equal to a focal length of the eyepiece array module.

3. The optical interference microscope system according to claim 1, wherein an aperture size of each of the optical channels is smaller than or equal to an aperture size of each of the eyepiece sets.

4. The optical interference microscope system according to claim 1, wherein the aperture size of each of the optical channels remains consistent.

5. The optical interference microscope system according to claim 1, wherein the continuous wall surface of each of the optical channel structures comprises a light-absorbing layer.

6. The optical interference microscope system according to claim 1, wherein the optical channel array module further comprises a main body, and the optical channel structures are arranged within the main body.

7. The optical interference microscope system according to claim 6, wherein the optical channel structures are a plurality of cavity structures penetrating the main body.

8. The optical interference microscope system according to claim 1, wherein the number of the imaging element is one.

9. The optical interference microscope system according to claim 1, wherein an optically effective region of the imaging element is greater than or equal to an optically effective region of the optical channel array module.

10. The optical interference microscope system according to claim 1, wherein a quantity of the objective lens sets, a quantity of the eyepiece sets, and a quantity of the optical channel structures are the same.

11. The optical interference microscope system according to claim 1, wherein the objective lens array module and the eyepiece array module are substantially identical.

12. The optical interference microscope system according to claim 1, wherein optical axes of the objective lens sets are parallel.

13. The optical interference microscope system according to claim 12, wherein the optical axes of the eyepiece sets are coaxial with the optical axes of the objective lens sets, respectively.

14. The optical interference microscope system according to claim 1, wherein the objective lens array module further comprises a substrate and a plurality of frames respectively disposed in a plurality of accommodation through holes of the substrate, the objective lens sets are respectively arranged in the frames, and the objective lens sets move relative to the substrate in an extension direction of an optical axis of each of the objective lens sets by the frames.

15. The optical interference microscope system according to claim 14, wherein each of the accommodation through holes of the substrate of the objective lens array module comprises an internal threaded structure, each of the frames of the objective lens array module comprises an external thread structure, the external thread structure is adapted to the internal threaded structure, and relative positions between each of the frames and the substrate are changed according to a relative rotation angle between the external thread structure and the internal threaded structure corresponding to each other.

16. The optical interference microscope system according to claim 15, wherein each of the frames of the objective lens array module further comprises at least one adjustment hole for respectively adjusting the relative positions between the frames and the substrate of the objective lens array module.

17. The optical interference microscope system according to claim 15, wherein the substrate of the objective lens array module further comprises a calibration through hole located at a symmetrical center of the accommodation through holes to allow a calibration beam to pass through.

* * * * *